United States Patent [19]

Nishioka et al.

[11] Patent Number: 5,166,928
[45] Date of Patent: Nov. 24, 1992

[54] COMMUNICATION SYSTEM COMPRISING A COMMUNICATION LINE MONITOR FOR MONITORING A COMMUNICATION LINE

[75] Inventors: Shinako Nishioka, Souraku; Shotaro Tanaka, Katano; Tohru Sakon, Hirakata; Masao Ikezaki, Neyagawa, all of Japan

[73] Assignee: Matsushita Electric Industrial Co., Ltd., Osaka, Japan

[21] Appl. No.: 690,697

[22] Filed: Apr. 24, 1991

[30] Foreign Application Priority Data

Apr. 27, 1990 [JP] Japan ................... 2-113374

[51] Int. Cl.⁵ .................... H04J 3/14
[52] U.S. Cl. .................. 370/85.1; 370/94.1; 340/717
[58] Field of Search ......... 370/94.1, 85.4, 85.1, 370/85.5; 340/717, 825.15, 825.17, 825.07, 825.08

[56] References Cited

U.S. PATENT DOCUMENTS

| | | | |
|---|---|---|---|
| 4,653,048 | 3/1987 | Anderson et al. | 370/61 |
| 4,747,100 | 5/1988 | Roach et al. | 370/85.5 |
| 4,933,937 | 6/1990 | Konishi | 370/94.1 |
| 5,042,027 | 8/1991 | Takase et al. | 370/60 |

*Primary Examiner*—Douglas W. Olms
*Assistant Examiner*—Min Jung
*Attorney, Agent, or Firm*—Wenderoth, Lind & Ponack

[57] ABSTRACT

A communication system includes plural terminal apparatuses and a communication line monitor connected to a common a communication line. The monitor transmits to each of the terminal apparatuses a request signal for requesting each of the terminal apparatuses to transmit the data of a correspondence table, showing a relation between packet data and character codes corresponding thereto, when the monitor is initialized, receives the data of the correspondence table from each of the terminal apparatuses, and stores the received data of the correspondence tables in a memory. Thereafter, the monitor receives packet data transmitted through the communication line, coverts the received packet data into corresponding character codes by referring to the data of the correspondence tables stored in the memory, and displays the converted character codes on a display unit.

5 Claims, 8 Drawing Sheets

| MA | SA | CF | OPC | OPR |
|---|---|---|---|---|

Fig. 6

| Frame No. | MA | SA | CF | COMMAND (OPC, OPR) |
|---|---|---|---|---|
| 01 | 0120 | 0128 | 0A | (A0)(70) |
| 02 | 0128 | 0130 | 0A | (C1)(60) |
| 03 | 0120 | 0148 | 0A | (A4)(70) |
| 04 | 0120 | 0160 | 0A | (A5)(70) |
| 05 | 0110 | 0120 | 0A | (A6)(41)(42)(43) |
| 06 | | | | |
| 07 | | | | |
| 08 | | | | |
| 09 | | | | |
| 10 | | | | |

Fig. 7

| Frame No. | MA | SA | CF | COMMAND (OPC, OPR) |
|---|---|---|---|---|
| 01 | VTRO | VTSO | WC+IK | POWER-ON |
| 02 | VTSO | VDPO | WC+IK | MEDIUM EJECT |
| 03 | VTRO | VDEO | WC+IK | INHIBIT ON |
| 04 | VTRO | VEFO | WC+IK | PRESENT ON |
| 05 | SBXO | VTRO | WC+IK | SET-DEV-USERNAME=ABC |
| 06 | | | | |
| 07 | | | | |
| 08 | | | | |
| 09 | | | | |
| 10 | | | | |

Fig. 8 PRIOR ART

COMMUNICATION SYSTEM COMPRISING A COMMUNICATION LINE MONITOR FOR MONITORING A COMMUNICATION LINE

BACKGROUND OF THE INVENTION

1. Field of the Invention

The present invention relates to a communication system comprising a communication line monitor, and more particularly, to a communication system comprising plural terminal apparatuses and a communication line monitor for monitoring a communication line. The present invention also relates to a communication line monitor for monitoring a communication line connected to plural terminal apparatuses, and further, to a method for monitoring a communication line connected to plural terminal apparatuses.

2. Description of the Prior Art

Figure 8:
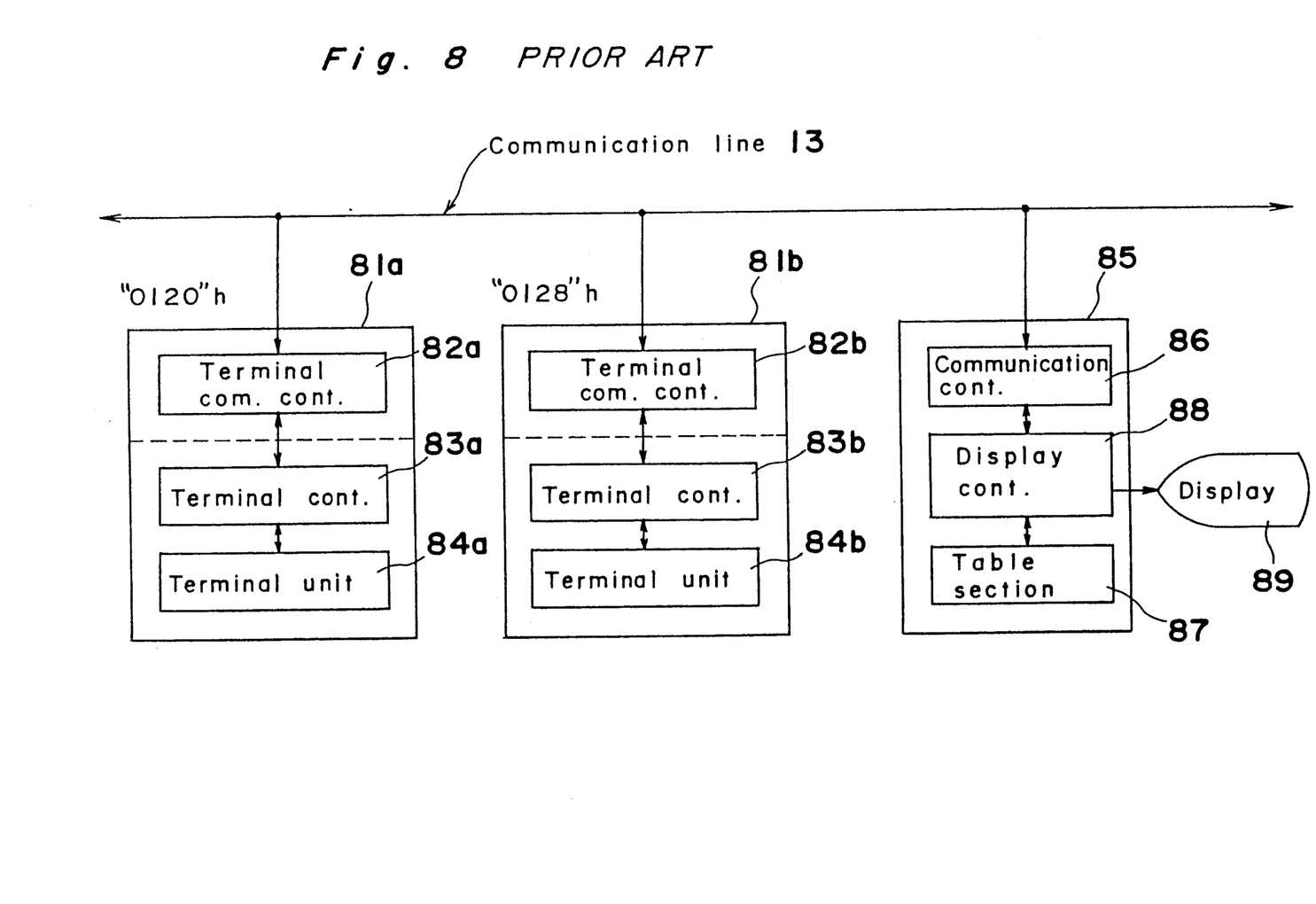
FIG. 8 is a schematic block diagram showing a communication system comprising terminal apparatuses and a line monitor of the prior art.

FIG. 8 shows a communication system comprising two terminal apparatuses 81a and 81b which are connected to a communication line 13.

Referring to FIG. 8, the terminal apparatus 81a comprises a terminal unit 84a, a terminal controller 83a for controlling the terminal unit 84a, and a terminal communication controller 82a connected to the terminal controller 83a and to the communication line 13. Similarly the terminal apparatus 81b comprises a terminal unit 84b, a terminal controller 83b for controlling the terminal unit 84b, and a terminal communication controller 82b connected to the terminal controller 83b and to the communication line 13. Further, in order to display packet data of one frame transmitted between respective terminal communication controllers 82a and 82b, there is provided a line monitor 85 comprising a communication controller 86 for receiving packet data transmitted from a terminal communication controller 81a or 81b through the communication line 13, a display controller 88 for controlling a display unit 89, the display unit 89 for displaying contents of the packet data, and a table section 87 having a RAM operably connected to the display controller 88 for storing a table of a correspondence relationship between packet data and character code corresponding to the packet data (referred to as a correspondence table hereinafter).

Figure 5:
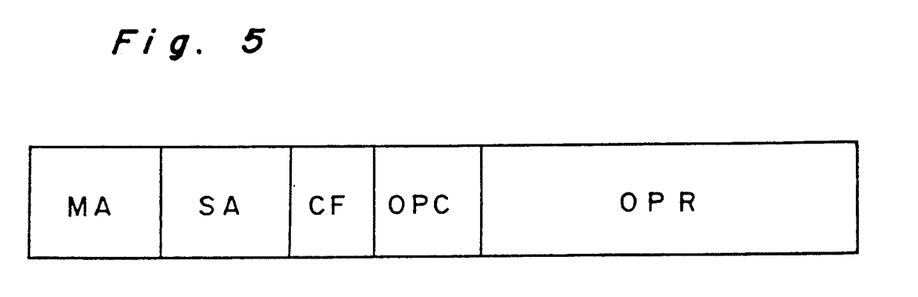
FIG. 5 is a diagram showing one example of one frame of packet data transmitted between the terminal apparatuses of the preferred embodiment and of the prior art shown FIG. 8.

FIG. 5 shows one example of packet data transmitted between respective terminal apparatuses 81a and 81b.

Referring to FIG. 5, one frame of packet data is composed of a master address MA, a slave address SA, a control field CF, an operation code OPC and an operand OPR. The two byte master address MA represents an address of a terminal apparatus 81a or 81 b which transmits packet data, and the two byte slave address SA represents an address of another terminal apparatus 81b or 81a which receives the packet data. The one byte control field CF represents an attribute of the packet data. In the case of transmitting a command, the control field CF is set at "0A"h (h denotes a hexadecimal number), which denotes an operation "WRITE COMMAND AND LOCK" for locking the occupation of a receiving terminal apparatus and writing a command therein. The operation code OPC and the operand OPR represent command data to be transmitted to the receiving terminal apparatus, where the one byte operation code OPC denotes a type of command and the operand OPR including detailed contents of the operation code OPC.

One example, in which the terminal apparatus 81a is a video tape recorder No. 0 having an address "0120"h and the terminal apparatus 81b is a video system controller No. 0 having an address "0128"h, will be described below.

When the terminal apparatus 81a of the video tape, recorder No. 0 transmits a "POWER ON" command to the terminal apparatus 81b, i.e. the video system controller No. 0, the master address MA of the packet data transmitted is "0120"h, the slave address SA thereof is "0128"h, the control field CF thereof is "0A"h, the operation code OPC thereof is "A0"h, and the operand OPR is "70"h. In this case, the terminal unit 84a instructs the terminal communication controller 82a through the terminal controller 83a to transmit this command to the terminal communication controller 82b of the terminal apparatus 81b, and then, the terminal communication controller 82a transmits the above-mentioned packet data to the terminal communication controller 82b of the terminal apparatus 81b. Then the terminal communication controller 82b instructs the terminal controller 83b to turn on (i.e. ("Power ON") the terminal unit 84b.

Figure 6:
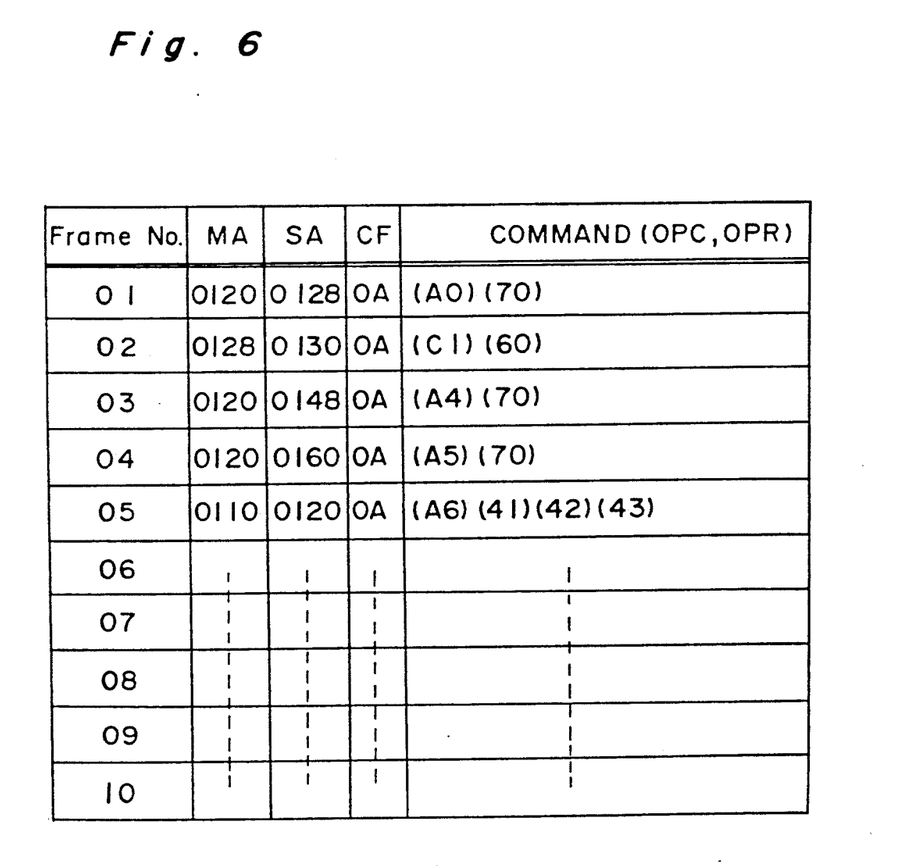
FIG. 6 is a diagram showing a monitored packet data displayed in a form of hexadecimal numbers on a display unit of the preferred embodiment and of the prior art.

During this communication operation, the communication controller 86 of the line monitor 85 receives the transmitted and received packet data in a manner similar to that of the terminal communication controller 82b, and then, outputs such data to the display controller 88. Thereafter, the display controller 88 displays the received packet data in a hexadecimal number form on the display unit 89 as shown in FIG. 6. Further, in order to display character codes of the received packet data, the display controller 88 analyzes the packet data by referring to the table section 87 showing a correspondence between the packet, data and the character codes, converts the packet data into corresponding character codes, and displays the converted character codes on the display unit 89 as shown in FIG. 7.

Figure 7:
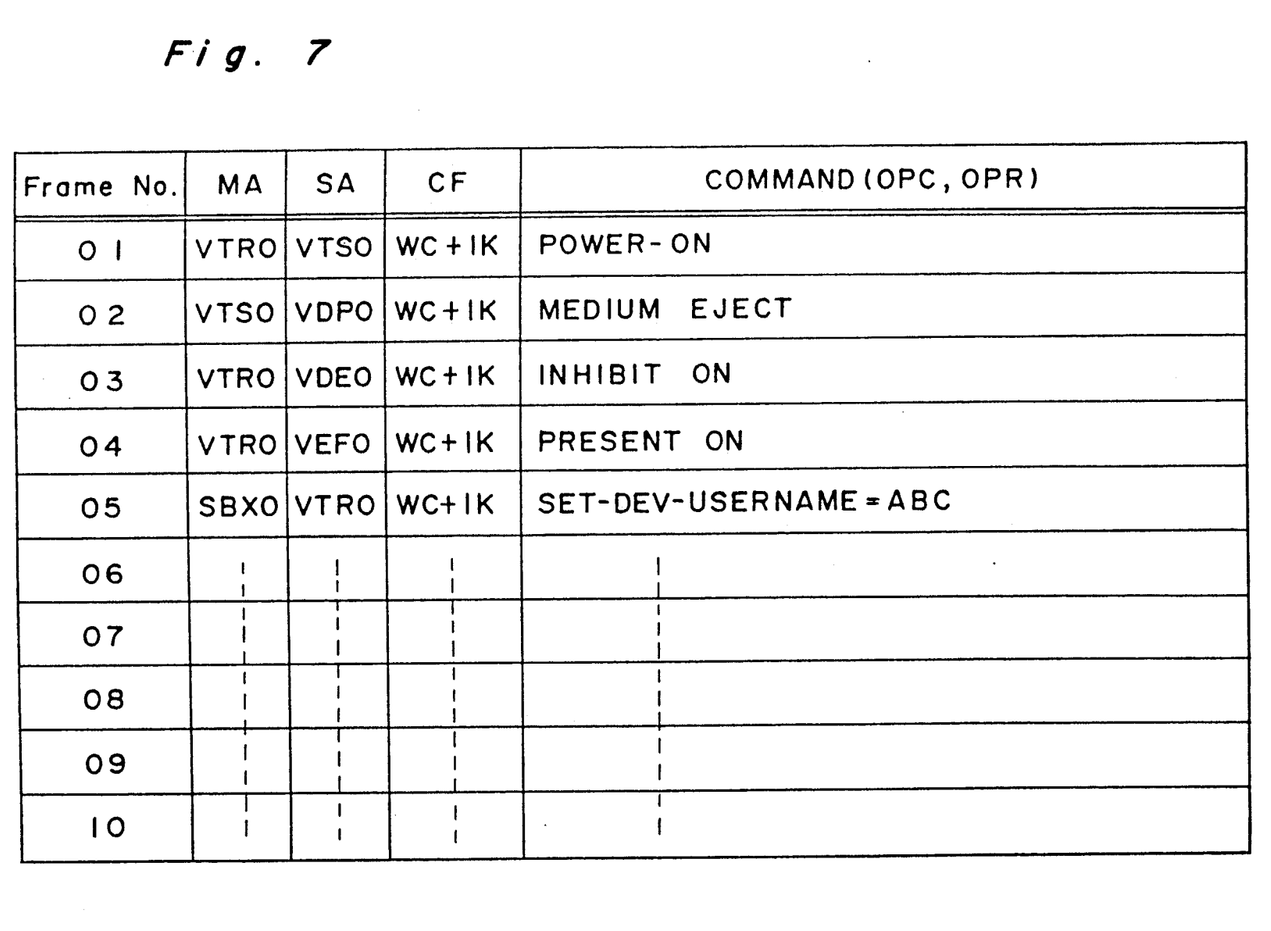
FIG. 7 is a diagram showing a monitored packet data displayed in a form of character codes on the display unit of the preferred embodiment and of the prior art.

In FIGS. 6 and 7, frame No. 01 corresponds to the packet data of the above example, and the contents shown in FIG. 6 correspond the contents shown in FIG. 7, respectively. Namely, the master address "0120"h corresponds to a character code "VTR0", the slave address "0128"h corresponds to a character code "VTS0", the control field "0A"h corresponds to a character code "WC+lk", the command "A0"h corresponds to a character code "POWER", and the command "70"h corresponds to a character code "N".

Thus, the display controller 88 of the line monitor 85 displays the character codes on the display unit 89 by analyzing the received packet data by referring to the correspondence table stored in the table section 87 to thereby convert the packet data into the character codes.

However, in the above-mentioned conventional communication system, in the case where a terminal apparatus having a function of processing a new command is added to the communication system, such that a new type of packet data is added, or such that the packet data is altered, the line monitor 85 which refers to the original correspondence table stored in the table section 87 can not process such new or altered types of packet data, namely, can not convert such data into character codes for and display the display unit 89.

SUMMARY OF THE INVENTION

The object of the present invention is to provide a communication system capable of converting respective packet data into character codes and displaying the thus converted character codes on a display unit even though another new terminal apparatus has been added to the communication system, and even through new packet data has been added or previous packet data has been altered.

Another object of the present invention is to provide a communication line monitor capable of converting respective packet data into character codes and displaying the thus converted character codes on a display unit even though another new terminal apparatus has been added to the communication system, and even through new packet data has been added or previous packet data has been altered.

A further object of the present invention is to provide a method for monitoring a communication line which is capable of converting respective data of packet data into character codes and displaying the thus converted character codes on a display unit even though another new terminal apparatus has been added to the communication system, and even through new packet data has been added or previous packet data has been altered.

In order to achieve the aforementioned objectives, according to one aspect of the present invention, there is provided a communication system comprising plural terminal apparatuses for communicating with each other using packet data and a communication line monitor for monitoring said packet data the plural terminal apparatuses and the communication line monitor being connected to each other through a communication line;

each of said terminal apparatuses comprising:

first storage means for storing a correspondence data table representing a correspondence between packet data to be transmitted to another terminal apparatus and character codes corresponding to said packet data, and first control means for reading out correspondence data table from said first storage means in response to a request signal and transmitting the thus read correspondence data table to said communication line monitor through said communication line; and said communication line monitor comprising:

display means for displaying character codes of packet data, second storage means for storing said data of the correspondence data tables of respective ones of said terminal apparatuses, second control means for transmitting said request signal to each of said terminal apparatus when said communication line monitor is initialized, receiving a correspondence data table transmitted by said first control means of each of said terminal apparatuses, and storing the thus received correspondence data tables in said second storage means, and third control means for receiving packet data which are transmitted from one of said terminal apparatuses to another one of said terminal apparatuses, converting the thus received packet data into character codes corresponding to said received packet data referring to said correspondence data tables of said terminal apparatuses stored in said second storage means, and displaying said converted character codes on said display means.

According to another aspect of the present invention, there is provided a communication line monitor for monitoring a communication line which is connected to plural terminal apparatuses which communicate with each other by transmitting and receiving packet data on said communication line, each of said terminal apparatuses having a correspondence data table between representing a correspondence between packet data to be transmitted to another terminal apparatus and character codes corresponding to said packet data, said communication line monitor comprising:

display means for displaying character codes of packet data;

storage means for storing said correspondence data tables of respective ones of said terminal apparatuses;

second control means for transmitting to each of said terminal apparatuses a request signal for requesting each of said terminal apparatuses to transmit said correspondence data table to said communication line monitor when said communication line monitor is initialized. and receiving said correspondence data table transmitted from each of said terminal apparatuses and storing the thus received correspondence data table in said storage means; and third control means for receiving packet data which are transmitted from one of said terminal apparatuses to another one of said terminal apparatuses, converting the thus received packet data into character codes corresponding to said received packet data referring to said correspondence data tables of said terminal apparatuses stored in said storage means, and displaying the thus converted character codes on said display means.

According to a further aspect of the present invention, there is provided a method for monitoring a communication line which is connected to plural terminal apparatuses which communicate with each other by transmitting and receiving packet data on said communication line, each of said terminal apparatuses having a correspondence data table representing a correspondence between packet data to be transmitted to another terminal apparatus and character codes corresponding to said packet data, said method including the steps of:

transmitting to each of said terminal apparatuses a request signal for requesting each of said terminal apparatuses to transmit the correspondence data table thereof; to said communication line monitor when said communication line monitor is initialized;

receiving said correspondence data table transmitted from each of said terminal apparatuses;

storing said received correspondence data table in storage means;

receiving packet data which are transmitted from one of said terminal apparatuses to another one of said terminal apparatuses;

converting the thus received packet data into character codes corresponding to said received packet data referring to said correspondence data tables of said terminal apparatuses stored in said storage means; and displaying the thus converted character codes on display means.

BRIEF DESCRIPTION OF THE DRAWINGS

These and other objects and features of the present invention will become clear from the following description taken in conjunction with the preferred embodiments thereof with reference to the accompanying drawings in which like parts are designated by like reference numerals throughout, and in which.

DETAILED DESCRIPTION OF THE PREFERRED EMBODIMENTS

The preferred embodiment according to the present invention will be described below with reference to the attached drawings.

Figure 1:
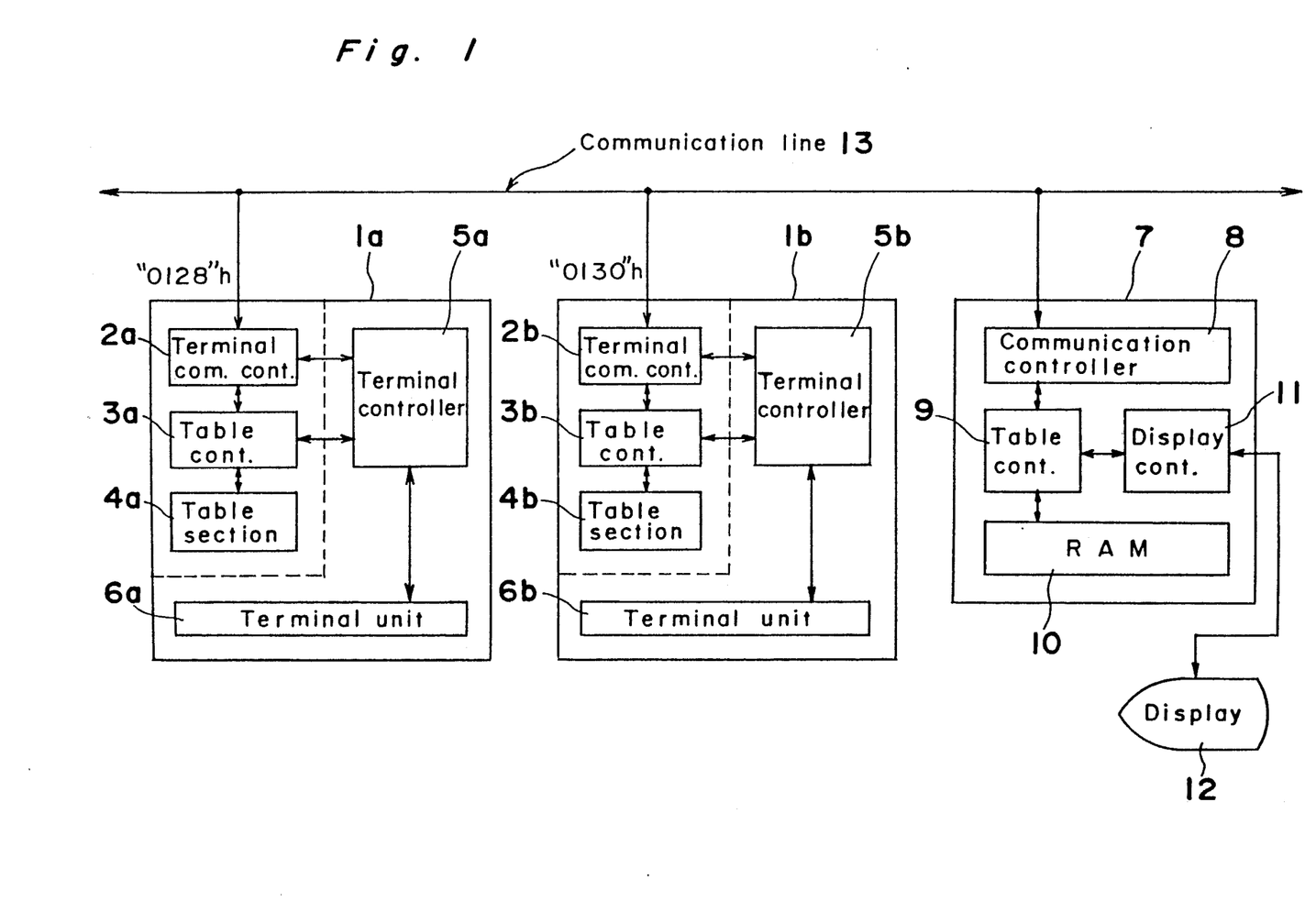
FIG. 1 is a schematic block diagram showing a communication system comprising two terminal apparatuses and a line monitor of a preferred embodiment according to the present invention.

FIG. 1 shows a communication system comprising two terminal apparatuses 1a and 1b and a line monitor 7 which are connected to a communication line 13.

The terminal apparatus 1a comprises a terminal communication controller 2a for communicating with another terminal communication controller 2b of another terminal apparatus 1b through the communication line 13, a table section 4a having a RAM for storing a correspondence data table of respective packet data to be transmitted from the terminal apparatus 1a to another terminal apparatus 1b and character codes corresponding thereto, a table controller 3a for reading out correspondence data table in response to a request signal therefor, a terminal unit 6a for performing a predetermined process of the terminal apparatus 1a, and a terminal controller 5a for controlling the operation of tee terminal unit 6a, the terminal communication controller 2a and the table controller 3a.

Similarly, the terminal apparatus 1b comprises a terminal communication controller 2b for communicating with another terminal communication controller 2a of another terminal apparatus 1a through the communication line 13, a table section, 4b having a RAM for storing a correspondence data table of respective packet data to be transmitted from the terminal apparatus 1b to another terminal apparatus 1a and character codes corresponding thereto, a table controller 3b for reading out the correspondence data table in response to a request signal therefor, a terminal unit 6b for performing a predetermined process of the terminal apparatus 1b, and a terminal controller 5b for controlling the operation of the terminal unit 6b, the terminal communication controller 2b and the table controller 3b.

Further, the line monitor 7 is provided for displaying contents of packet data which are transmitted and received between the terminal apparatuses 1a and 1b. The line monitor 7 comprises a communication controller 8 for receiving packet data which are transmitted from each of the terminal apparatuses 1a and 1b, a table controller 9 for storing packet data received by the communication controller 8 into a RAM 10 and for reading out data from the RAM 10, the RAM 10 for storing the received packet data, a display controller 11 for displaying the received packet data and character codes corresponding thereto on a display unit 12, and the display unit 12 for displaying the received packet data and the character codes corresponding thereto.

As an example, the case will be described below in which the case that the terminal apparatus 1a is a video system controller having an address "0128"h, the terminal apparatus 1b is a video disk player having an address "0130"h and the terminal apparatuses 1a and 1b and the line monitor 7 are connected to each other through the communication line 13. In order to display packet data, which are transmitted and received between the terminal apparatuses 1a and 1b, and character codes corresponding thereto, the line monitor 7 is turned on and is initialized.

Figure 3:
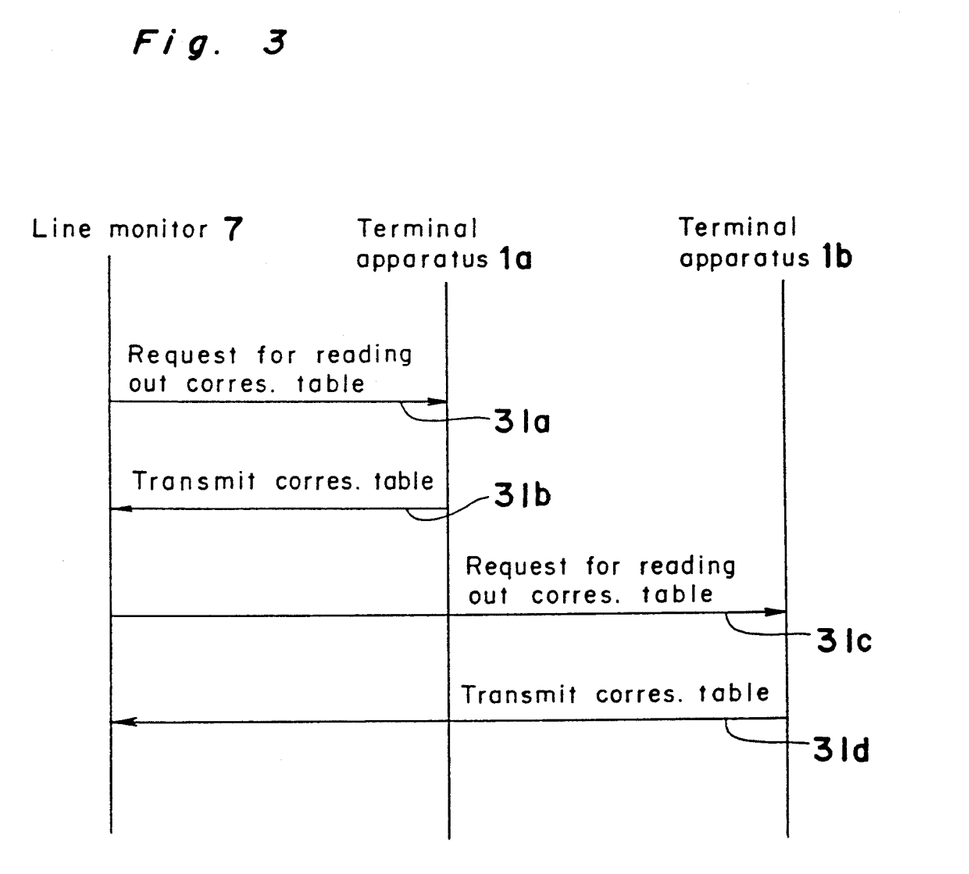
FIG. 3 is a diagram showing a communication sequence used in the communication system shown in FIG. 1.

FIG. 3 shows a communication sequence to be performed when the line monitor 7 is initialized.

First, at step 31a, the table controller 9 of the line monitor 7 transmits a request signal to the table controller 3a of the terminal apparatus 1a through the communication controller 8, the communication line, 13 and the terminal communication controller 2a. The request signal is for instructing the table controller 3a to read out the correspondence data table from the table section 4a. Thereafter, at step 31b, in response to the request signal, the table controller 3a reads out the correspondence data table including the address data, the control field CF and the commands such as the operation code OPC and the operand OPR, and the character codes corresponding thereto, and then, at step 31b, transmits such data to the table controller 9 through the terminal communication controller 2a, the communication line 13 and the communication controller 8 of the line monitor 7. Then, the table controller 9 stores the received correspondence data table in the RAM 10, sequentially.

Thereafter, at step 31c, the table controller 9 of the line monitor 7 transits a request signal to the table controller 2b of the terminal apparatus 1b through the communication controller 8, the communication line 13 and the terminal communication controller 2b. The request signal is for instructing the table controller 3b to read out the correspondence data table from the table section 4b. Thereafter, at step 31d, in response to the request signal, the table controller 3b reads out the correspondence data table including the address data, the control field CF and the commands such as the operation code OPC and the operand OPR, and the character codes corresponding thereto, and then, at step 31d, transmits such data to the table controller 9 through the terminal communication controller 2b, the communication line 13 and the communication controller 8 of the line monitor 7. Then, the table controller 9 stores the received correspondence data table in the RAM 10, sequentially.

Figure 2:
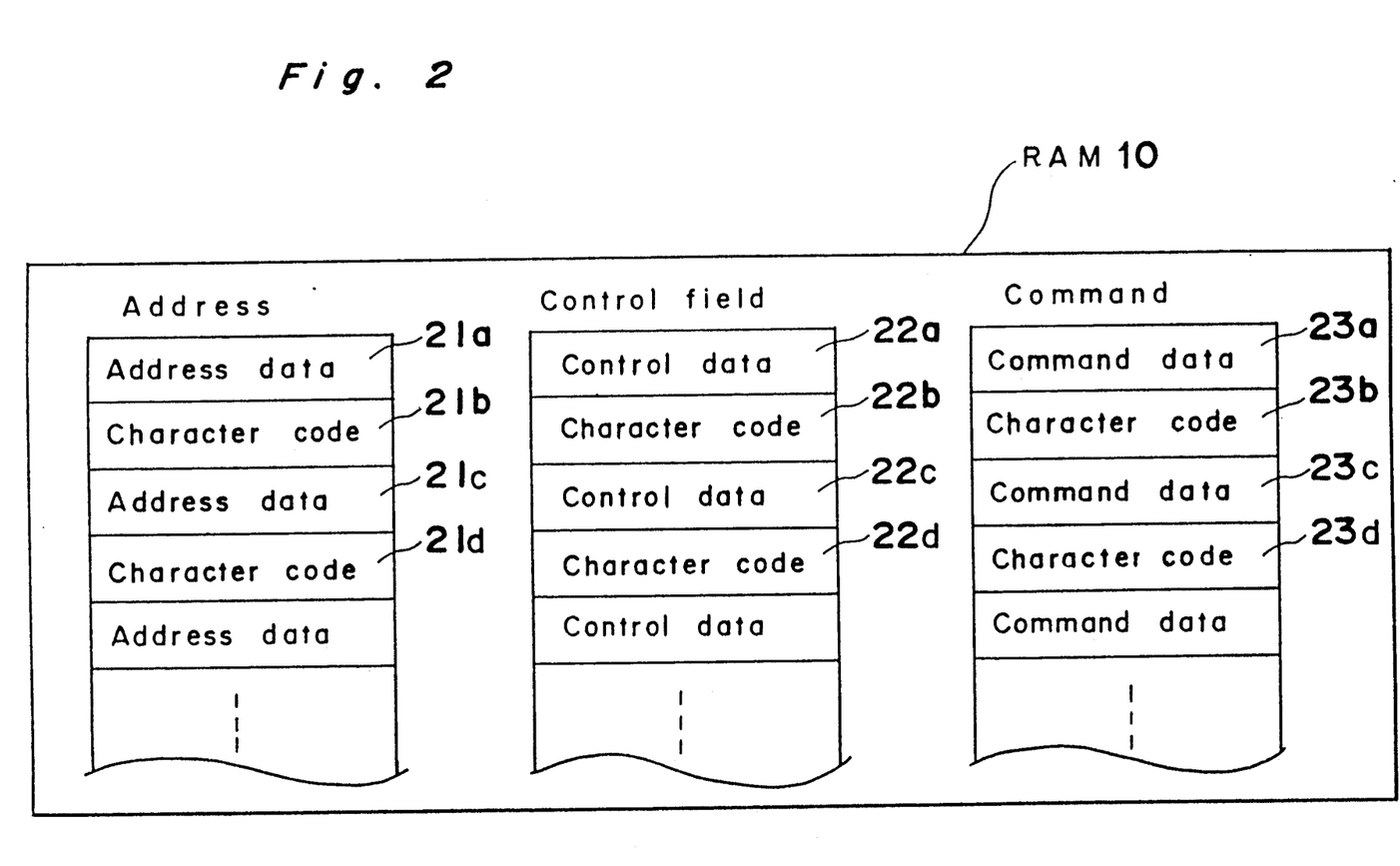
FIG. 2 is a memory map of a RAM of the line monitor shown in FIG. 1, showing contents stored therein.

FIG. 2 is a memory map of the RAM 10 showing the correspondence data tables of respective terminal apparatuses 1a and 1b which are stored in the RAM 10 after the above-mentioned step 31d.

In an address memory area of the RAM 10, data are stored in the order of an address data 21a, a character code 21b corresponding to the address data 21a, an address data 21c, a character code 21d corresponding to the address data 21c, and so on. In a control field CF memory area of the RAM 10, data are stored in the order of a control data 22a, a character code 22b corresponding to the control data 22a, a control data 22c, a character code 22d corresponding to the control data 22c, and so on. In a command memory area of the RAM 10, data are stored in the order of a command data 23a, a character code 23b corresponding to the command data 23a, a command data 23c, a character code 23d corresponding to the command data 23c, and so on. Thus, the various packet data and the character codes corresponding thereto with respect to all of the terminal apparatuses 1a and 1b are stored in the RAM 10.

When a command of "MEDIA EJECT" is transmitted from the terminal apparatus 1a, i.e. video system controller, to the terminal apparatus 1b, i.e. the video disk player, one frame of packet data is transmitted which is composed of a master address MA "0128"h, a slave address SA "0130"h, a control field CF "0A"h representing "WRITE COMMAND AND LOCK" which denotes an operation of locking occupation of a receiving terminal apparatus and writing the command therein, an operation code "C1"h, and an operand of "60"h.

In this case, the terminal unit 6a of the terminal apparatus 1a first instructs the terminal communication controller 2a through the terminal controller 5a to transmit packet data including the above command, and then, the terminal communication controller 2a transmits the packet data to the terminal communication controller 2b of the terminal apparatus 1b through the communication line 13. In response to this packet data, the terminal communication controller 2b instructs the terminal controller 5b to control the terminal unit 6b according to the command of the packet data.

During this communication sequence, the one frame of packet data which are transmitted from the terminal communication controller 2a through the communication line 13 to the terminal communication controller 2b are also received by the communication controller 8 of the line monitor 7, in a manner similar to that of the terminal communication controller 2b, and the received packet data are outputted to the table controller 9. In response to this, the table controller 9 outputs the packet data to the display controller 11 and instructs the display controller 11 to display the contents of the received packet data on the display unit 12 in the form of hexadecimal numbers as shown in a frame No. 02 of FIG. 6. The table controller 9 also enables the display controller 11 to, display character codes corresponding to the received packet data according to the flowcharts shown in FIG. 4a and 4b depicting a character code display routine executed by the table controller 9.

Figure 4A:
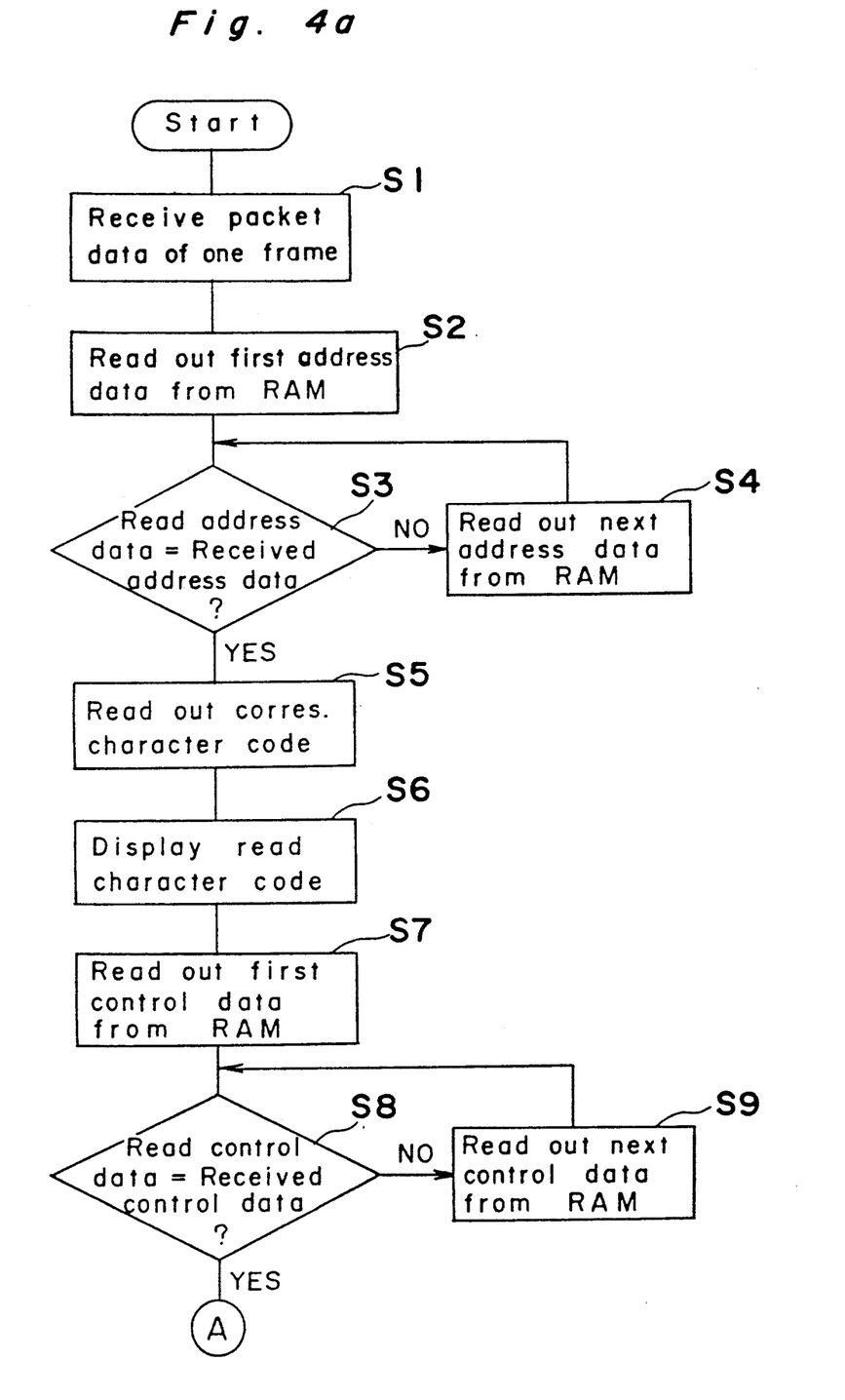
FIGS. 4a and 4b are flowcharts showing a routine executed by a table controller of the line monitor shown in FIG. 1.
Figure 4B:
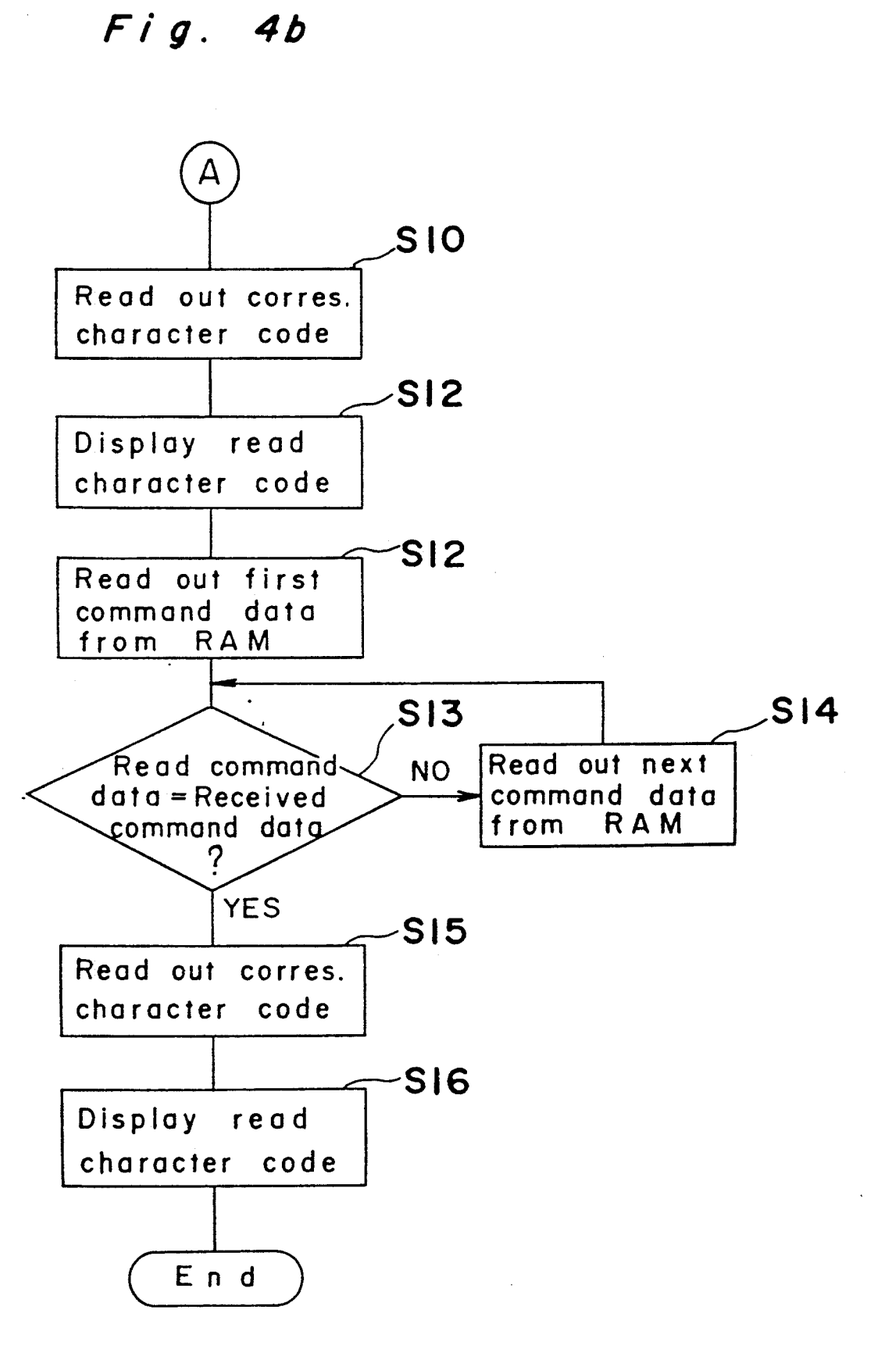

Referring to FIG. 4a, when the table controller 9 receives one frame of packet data at step S1, it reads out the first address data 21a from the RAM 10 shown in FIG. 2 at step S2, and then, the program proceed, to step S3. At step S3, the table controller 9 judges whether or not the read address data is the same as the address of the received packet data. If the read address data is the same as the received packet data address (Yes at step S3), the program proceeds to step S5. Otherwise, the program flow goes to step S4 where the table controller 9 reads out the next address data from the RAM 10, and then, the program returns to step S3. Therefore, a loop process of steps S3 and S4 is performed until the read address data is the same as the received packet data address.

Thereafter, the table controller 9 reads out the character code corresponding, to the address data which is the same as the received packet data address at step S5, and instructs the display controller 11 to display the thus read character code on the display unit 12 at step S6. Then, the character code corresponding to the received packet data address is displayed on the display unit 12 as shown in a frame No. 02 of FIG. 7. In this case, a character code "VTS0" of the master address and a character code "VDP0" of the slave address are displayed.

Thereafter, the table controller 9 reads out the first control data 22a from the RAM 10 shown in FIG. 2 at step S7, and then, the program proceeds to step S8. At step S8, the table controller 9 judges whether or not the read control data is the same as the control data of the received packet data. If the read control data is the same as the received packet data control data (Yes at step S8), the program proceeds to step S10 of FIG. 4b. Otherwise, the program goes to step S9, where the table controller 9 reads out the next control data from the RAM 10, and then, the program returns to step S8. Therefore, a loop process of steps S8 and S9 is performed until the read control data is the same as the received packet data control data.

Thereafter, referring to FIG. 4b, the table controller 9 reads out the, character code corresponding, to the control data which is the same as the received packet data control data at step S10, and instructs the display controller 11 to display the thus read character code on the display unit, 12 at step S11. Then, the character code corresponding to the control data of the received packet data is displayed on the display unit 12 as shown in a frame No. 02 of FIG. 7. In this case, a character code "WC+1k" of the control field "0A"h is displayed.

Thereafter, the table controller 9 reads out the first command data 23a from the RAM 10 shown in FIG. 2 at step S12, and then, the program proceeds to step S13. At step S13, the table controller 9 judges whether or not the read command data is the same as the command data of the received packet data. If the read command data is the same as the received packet data command data (Yes at step S13), the program proceeds goes to step S15. Otherwise, the program goes to step S14, where the table controller 9 reads out the next command data from the RAM 10, and then, the program returns to step S13. Therefore, a loop process of steps S13 and S14 is performed until the read command data is the same as the received packet data command data.

Thereafter, the table controller 9 reads out the character code corresponding to the command data which is the same as the received packet data command data at step S15, and instructs the display controller 11 to display the thus read character code on the display unit 12 at step S16. Then, the character code corresponding to the command data of the received packet data is displayed on the display unit 12 as shown in a frame No. 02 of FIG. 7. In this case, a character code "MEDIUM" of the command "C1"h and a character code "EJECT" of the command "60"h are displayed.

In the communication system comprising plural terminal apparatuses 1a and 1b and the line monitor 7 of the preferred embodiment according to the present invention, even though another new terminal apparatus is added to the communication system, character codes corresponding to packet data which transmitted from the added terminal apparatus can be displayed on the display unit 12 since each terminal apparatus has the correspondence data table stored therein which are accessed to update the RAM 10 every time the line monitor 7 is initialized. Further, even though respective packet data are added or altered, character codes corresponding to added or altered transmitted packet data can be displayed on the display unit 12 since the contents stored in the RAM 10 are updated every time the line monitor 7 is initialized.

Accordingly, the line monitor 7 of the communication system of the/ preferred embodiment operates in a manner which is more flexible than that of the conventional communication system shown in FIG. 8.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A communication system comprising plural terminal apparatuses for communicating with each other by transmitting and receiving packet data on a communication line and a communication line monitor for monitoring said packet data transmitted and received on said communication line, said plural terminal apparatuses and said communication line monitor operatively connected to each other via said communication line;

each of said terminal apparatuses comprising:
first storage means for storing a correspondence data table denoting a correspondence between packet data to be transmitted to another terminal apparatus and character codes corresponding to said packet data, and
first control means for reading information from said correspondence data table stored in said first storage means in response to a request signal and transmitting the thus read correspondence data table information to said communication line monitor via said communication line;

said communication line monitor comprising:
display means for displaying character codes corresponding to packet data transmitted on said communication line,
second storage means for storing cumulative table data representing the correspondence data table information of respective ones of said plural terminal apparatuses,
second control means for transmitting said request signal to each of said terminal apparatus when said communication line monitor is initialized, for receiving the correspondence data table information respectively transmitted by said first control means of said plural terminal apparatuses, and for storing the thus received correspondence data table information in said second storage means as said cumulative table data, and
third control means for receiving packet data transmitted from one of said terminal apparatuses to another one of said terminal apparatuses, for converting the thus received packet data into character codes corresponding to said received packet data by referring to said cumulating table data stored in said second storage means, and for displaying the thus converted character codes on said display means.

2. The communication system as claimed in claim 1, wherein one frame of said packet data is composed of a master address, a slave address, a control field, and operation code and an operand.

3. A communication line monitor for monitoring a communication line connected to plural terminal apparatuses which communicate with each other by transmitting and receiving packet data on said communication line, each of said terminal apparatuses having a correspondence data table stored therein denoting a correspondence between packet data to be transmitted to another terminal apparatus and character codes corresponding to said packet data, said communication line monitor comprising:

display means for displaying character codes corresponding to packet data transmitted on said communication line;
storage means for storing cumulative table data representing correspondence data table information of respective ones of said plural terminal apparatuses;
first control means for transmitting to each of said terminal apparatuses a request signal for requesting each of said plural terminal apparatuses to transmit said correspondence data table information thereof to said communication line monitor when said communication line monitor is initialized, and for receiving said correspondence data table information transmitted from said plural terminal apparatuses and for storing the thus received correspondence data table information in said storage means as said cumulative table data; and
second control means for receiving packet data transmitted from one of said plural terminal apparatuses to another one of said plural terminal apparatuses, for converting the thus received packet data into character codes corresponding to said received packet data by referring to said cumulative table data stored in said storage means, and for displaying the thus converted character codes on said display means.

4. The communication line monitor as claimed in claim 3, wherein one frame of said packet data is composed of a master address, a slave address, a control field, an operation code and an operand.

5. A method for monitoring a communication line connected to plural terminal apparatuses which communicate with each other by transmitting and receiving packet data on said communication line, each of said terminal apparatuses having a correspondence data table stored therein denoting a correspondence between packet data to be transmitted to another terminal apparatus and character codes corresponding to said packet data, said method including the steps of:

transmitting to each of said terminal apparatuses a request signal for requesting each of said terminal apparatuses to transmit correspondence data table information thereof to said communication line monitor when said communication line monitor is initialized;
receiving said correspondence data table information transmitted from each of said plural terminal apparatuses;
storing as cumulative table data the thus received correspondence data table information in a memory;
receiving packet data transmitted from one of said terminal apparatuses to another one of said terminal apparatuses;
converting the thus received packet data into character codes corresponding to said received packet data4 by referring to said cumulative table data stored in said memory; and
displaying the thus converted character codes on a display device.

* * * * *